No. 889,984. PATENTED JUNE 9, 1908.
A. L. STREETER.
RAILWAY BRAKE.
APPLICATION FILED AUG. 5, 1907.

2 SHEETS—SHEET 1.

Witnesses:
G. Waubenschmidt
Charles B. Gillson.

Inventor:
Alfred L. Streeter.
By Geo. E. Waldo,
Atty.

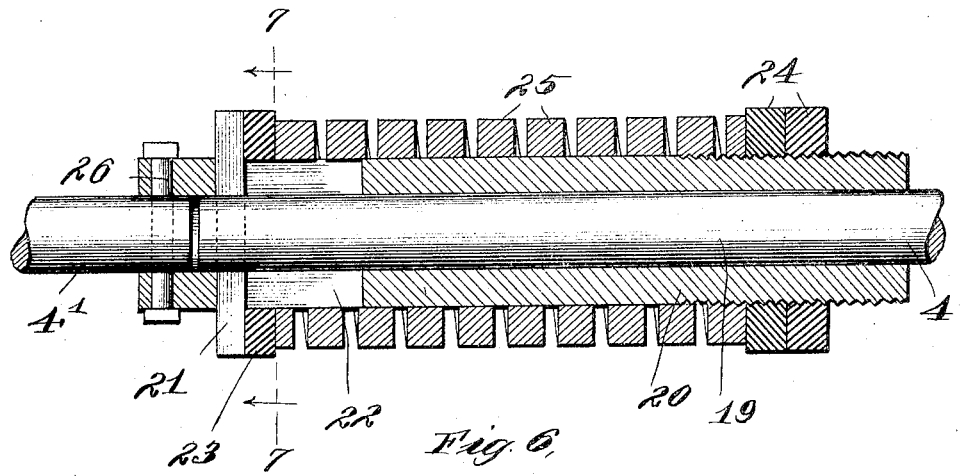
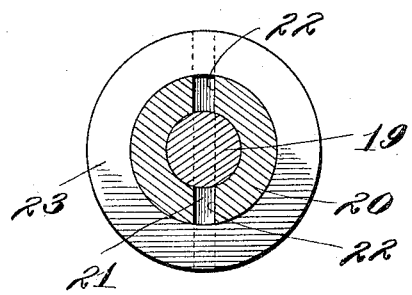

UNITED STATES PATENT OFFICE.

ALFRED L. STREETER, OF CHICAGO, ILLINOIS.

RAILWAY-BRAKE.

No. 889,984.

Specification of Letters Patent.

Patented June 9, 1908.

Application filed August 5, 1907. Serial No. 387,070.

*To all whom it may concern:*

Be it known that I, ALFRED L. STREETER, a citizen of the United States, and a resident of Chicago, in the county of Cook and State of Illinois, have invented certain new and useful Improvements in Railway-Brakes, of which the following is a specification.

This invention relates to railway brakes, and relates particularly to foundation brake gears.

Among the objects of the invention is to provide a brake gear which will be efficient in operation, that is, will apply the brakes quickly and with full force, and which will prevent "chattering" of the brakes and locking of the car wheels against turning by the brakes, with their incident objectionable features, and by means of which the car will be stopped quickly and with a smooth motion without any jolting or jarring. These ends I have accomplished by the use, in connection with a brake gear, of a device, which for purposes of convenient reference, I have designated a "resiliator", consisting of the various features, combinations of features and details of construction hereinafter described and claimed.

Figure 1:
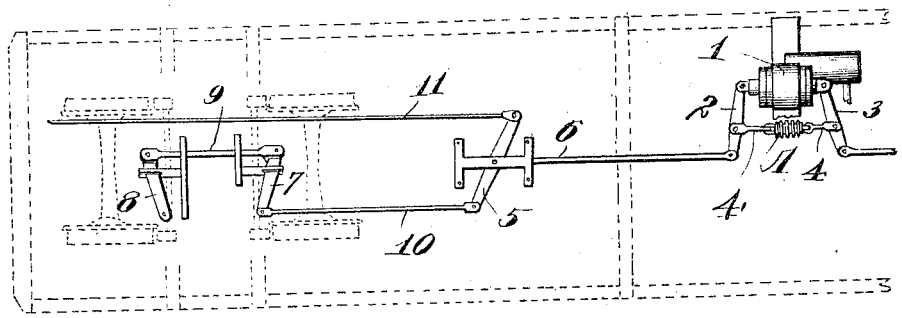
Figure 2:
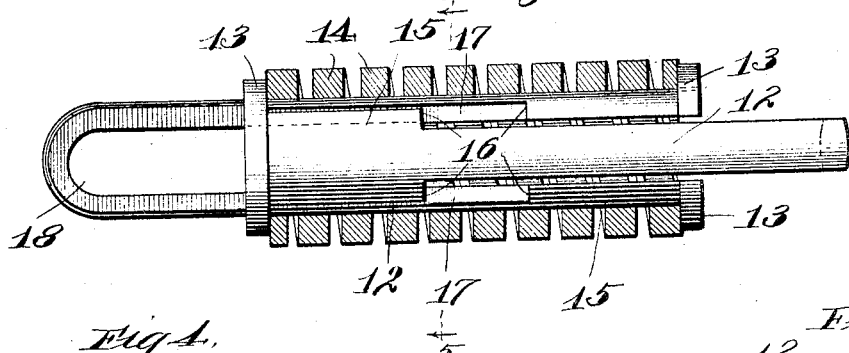
Figure 4:
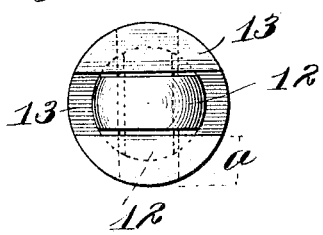
Figure 5:
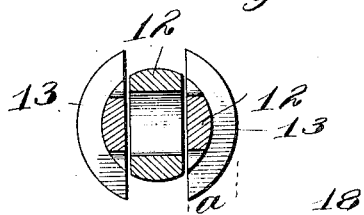
Figure 3:
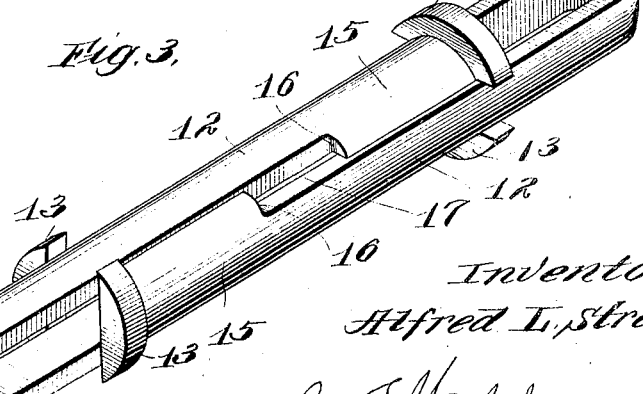

In the accompanying drawings, in which my invention is fully illustrated,—Figure 1 is a bottom plan view of one end of a car, shown in dotted lines, illustrating a standard type of brake gear embodying my improved resiliator. Fig. 2 is an enlarged side view of one form of my improved resiliator, the spring being shown in section. Fig. 3 is a perspective view of the form of resiliator shown in Fig. 2, when assembled, the spring being omitted. Fig. 4 is an end view thereof. Fig. 5 is a sectional view on the line 5—5 of Fig. 2. Fig. 6 is a longitudinal sectional view of a modified form of resiliator embodying my invention; and Fig. 7 is a sectional view thereof on the line 7—7 of Fig. 6.

The brake gear shown in Fig. 1 is of the inner hung type comprising a brake cylinder 1, cylinder levers 2 and 3 connected by a tie rod 4, a floating lever 5 connected substantially at its center to the cylinder lever 2 by a connecting rod 6, a live brake lever 7, a dead brake lever 8, a lower brake rod 9, a pull or connecting rod 10 connecting one end of the floating lever 5 with the upper end of the live brake lever 7 and a hand brake connecting rod 11 connecting the opposite end of the floating lever 5 with the hand brake. All of the foregoing parts are old and well known in the art and will be readily understood by those skilled in the art without further detailed description thereof.

At A, Fig. 1, I have indicated a resiliator of my invention applied to the cylinder lever tie rod 4, said resiliator being connected to different sections of said connecting rod and forming a yielding section thereon.

Broadly stated, my improved resiliator consists of two overlapping tension members adapted to play lengthwise, formed on the overlapping ends of which are stops or flanges between which is inserted a stiff cushion, preferably a coiled spring of sufficient strength, which surrounds the overlapping portion of said tension members as guides. The ends of said tension members opposite to those on which said stops or flanges are formed project through said cushion and are provided with means for attachment to sections of a brake gear connecting rod or other desired parts.

Specifically, my improved resiliator admits of embodiment in different forms and I do not, therefore, desire to limit myself to the particular forms thereof shown in the drawings.

Referring now particularly to Figs. 2 to 5, inclusive, of the drawings, in which the form of resiliator of my invention is illustrated in detail, 12 designates the tension members, consisting, as shown, of similar open ended links adapted to be interlocked at right angles, as best shown in Fig. 3, so that they will play lengthwise relatively to each other. Formed on the sides of the links 12 at the overlapping, open ends thereof are flanges 13, inserted between which is a coiled spring 14 which surrounds the overlapping ends of the links 12 as guides. Said spring will also operate to maintain said links 12 interlocked in operative position. As shown, the exterior surfaces of the links 12 are circular, being slightly smaller than the opening through the spring 14. Said links may, however, be of any other desired form in cross-section. Adjacent to the flanges 13, the links 12 are of the full width, as shown at 15, being reduced in width throughout the rest of their length, the relation being such that the edges of the wide portions 15 of each link will embrace the narrow portion of the other, thus forming guides therefor to hold the same in alinement. When the links 12 are interlocked, shoulders 16 at the ends of the wide portions 15 of different links will be opposed to each other, the length of the sections 15 and of the spring 14 being so proportioned that spaces 17 will be formed between the opposed shoulders 16 to provide for desired play of the links 12 relative to each other. For example, if it is desired to have the brakes applied yieldingly under all conditions, the lengths of the spaces will be such that opposed shoulders 16 will not be brought into contact, even when the brakes are applied with full power. On the other hand, should it be desired that the brakes be applied yieldingly at first and positively at the end, the spaces 17 may be made of such length that compression of the spring 14 by application of the brakes with less than full power, will bring opposed shoulders 16 into contact, after which no further play of the links 12 will be possible, thus forming a rigid connection and applying the brakes positively.

In order to provide for interlocking the links 12, the minimum dimension of the flanges 13, the dimension $a$, Fig. 4, will have to be less than the width of the opening between the sides of said links.

My improved resiliator is adapted to be connected into the brake gear by securing the parts to be connected into the loops 18 thereof, which project through the spring 14, when the resiliator is assembled.

The length and stiffness of the spring 14 will, of course, vary according to the duty required of it. In street car service, I have used, with satisfactory results, springs made of square steel 9/16" x 9/16" in cross section, 8" in length, when uncompressed, and wound with 1/4" spaces between adjacent coils.

I contemplate applying my resiliator at any place in the brake gear. But owing to the fact that the leverage is arranged to multiply the power of the cylinder pressure when applied to the brake shoes, the compression of the resiliator spring 14, if applied at a point close to the brake shoes, would produce an undesirable piston travel. For this reason, I prefer to apply the resiliator in such manner that its compression will not be multiplied, a desirable location therefor being in the cylinder lever tie rod 4. A further advantage of this application is that a single resiliator will answer for the entire brake gear at both ends of the car.

In order to save piston travel, in compression of the resiliator spring, my invention contemplates a resiliator so constructed that the spring will, at all times, be under a partial initial compression, the means for effecting such initial compression being self-contained in the resiliator so as not to exert any pull or strain on the brake gear.

In Figs. 6 and 7 I have shown a resiliator of this character, which I will now describe. In this form of the resiliator, the tension members consist of a rod 19, and a sleeve 20 which surrounds said rod. As indicated, said rod forms a section of the cylinder lever tie rod 4, but may equally well be any of the other brake gear connections or a separate rod, adapted for connection to a part of the brake gear. Secured in the rod 4 is a pin 21, the ends of which extend through slots 22 in the sleeve 20, providing for relative movement of said rod and sleeve. As shown, said pin 21 forms a support for a thrust washer 23, but my invention contemplates the omission of said thrust washer, if desired. Screw threaded to the sleeve 20 at a distance from the slots 22 is a nut or nuts 24 and inserted between said collar 23 and nut or nuts 24 is a coiled spring 25, which surrounds the outside of the sleeve 20 as a guide. The tie rod 4 consists of two separate sections, the section $4^1$ being adapted to be coupled to an extension of the sleeve 20, as by a bolt 26, which passes through suitable holes or openings in said sleeve and rod, the relation being such that the sections 4 and $4^1$ of said rod will always be separated by a space.

With the described construction, it is obvious that the spring 25 may be subjected to any desired initial compression by setting up the nut or nuts 24 and that the force of said spring will be entirely self-contained in the sleeve 20 of the resiliator, merely subjecting the washer 23, supported by the pin 21, and nut or nuts 24, to a thrust, without exerting any stress whatever on the rod sections 4 and $4^1$. When, however, the brakes are applied, the spring 25 will be further compressed, causing the pin 21 to move along the slots 22 and operating, as with the other form of resiliator, to apply the brakes yieldingly. As with the other form of resiliator, also, a final, positive braking action may be provided for by making the slots 22 of such length that the pin 21 will strike the ends of the slots 22 other than those against which said pin normally rests before said spring reaches the limit of its compression under the strain of the brake gear.

I claim:—

1. A resiliator comprising tension members constructed and arranged to play lengthwise relatively to each other and adapted for attachment to parts of a brake gear, stops on said tension members, a spring inserted between said stops and means self-contained in one tension member of said resiliator whereby said spring can be maintained under an initial compression without varying the operative length of the resiliator.

2. A resiliator comprising tension members constructed and arranged to play lengthwise relatively to each other and adapted for attachment to parts of a brake gear, stops on said tension members, a spring inserted between said stops and adjustable means self-contained in one of said tension members whereby said spring can be maintained under an initial compression without varying the operative length of the resiliator.

3. A resiliator comprising a rod, a sleeve which surrounds said rod, provided with longitudinal slots, a stop pin secured in said rod which projects outwardly through the slots in said sleeve, a stop on said sleeve at a distance from said stop pin, and a compression spring inserted between said stop pin and stop.

4. A resiliator comprising a rod, a sleeve which surrounds said rod, provided with longitudinal slots, a stop pin secured in said rod which projects outwardly through the slots in said sleeve, an adjustable stop on said sleeve at a distance from said stop pin and a spring inserted between said stop pin and adjustable stop.

5. A resiliator comprising a rod, a sleeve which surrounds said rod, provided with longitudinal slots, a stop pin secured in said rod which projects through the slots in said sleeve, a nut threaded to said sleeve at a distance from said stop pin, and a spring inserted between said stop pin and nut.

6. A resiliator comprising a rod, a sleeve which surrounds said rod, provided with longitudinal slots, a stop pin secured in said rod which projects through the slots in said sleeve, a washer adapted to bear against said stop pin, a stop on said sleeve at a distance from said stop pin and a spring inserted between said washer and said stop on said sleeve.

In testimony, that I claim the foregoing as my invention, I affix my signature in presence of two subscribing witnesses, this 24th day of July, A. D. 1907.

ALFRED L. STREETER.

Witnesses:
JOSEPH B. MULLIGAN,
FRED. W. ROTH.